(12) United States Patent
Hariu et al.

(10) Patent No.: US 8,418,581 B2
(45) Date of Patent: Apr. 16, 2013

(54) ACCELERATOR APPARATUS

(75) Inventors: Tetsuo Hariu, Kariya (JP); Haruhiko Suzuki, Anjo (JP)

(73) Assignee: Denso Corporation, Kariya (JP)

( * ) Notice: Subject to any disclaimer, the term of this patent is extended or adjusted under 35 U.S.C. 154(b) by 291 days.

(21) Appl. No.: 12/403,716

(22) Filed: Mar. 13, 2009

(65) Prior Publication Data

US 2009/0266196 A1 Oct. 29, 2009

(30) Foreign Application Priority Data

Mar. 19, 2008 (JP) ................................ 2008-071687
Oct. 28, 2008 (JP) ................................ 2008-276854

(51) Int. Cl.
*G05G 1/30* (2008.04)
(52) U.S. Cl.
USPC ........................................................... 74/513
(58) Field of Classification Search .................... 74/512, 74/513, 560
See application file for complete search history.

(56) References Cited

U.S. PATENT DOCUMENTS

| 5,768,946 | A * | 6/1998 | Fromer et al. ................... 74/514 |
| 6,725,741 | B2 * | 4/2004 | Menzies ............................ 74/514 |
| 2005/0268741 | A1 * | 12/2005 | Wilczek et al. .................. 74/513 |
| 2006/0117902 | A1 * | 6/2006 | Martin et al. .................... 74/512 |

FOREIGN PATENT DOCUMENTS

| JP | 2003-148908 | 5/2003 |
| JP | 2007-182150 | 7/2007 |
| JP | 2007-276707 | 10/2007 |

OTHER PUBLICATIONS

Japanese Office Action dated Nov. 24, 2009, issued in corresponding Japanese Application No. 2008-276854, with English translation.
Examination Report issued in Chinese Appl. 200910128228.8 on Jan. 29, 2012.

* cited by examiner

*Primary Examiner* — Vicky Johnson
(74) *Attorney, Agent, or Firm* — Nixon & Vanderhye P.C.

(57) ABSTRACT

A rotational angle sensor and a connector are provided at a first-side portion and a second-side portion, respectively, of a sensor holder. The first-side portion is engaged with a base through a primary engaging arrangement, and the second-side portion is engaged with the base through a secondary engaging arrangement. The secondary engaging arrangement includes secondary engaging portions of the sensor holder, which are provided in the second-side portion of the sensor holder and are engaged with the base. A distance from an engaging point between the secondary engaging portion of the sensor holder and the base to the sensor is longer than a distance from the engaging point between the secondary engaging portion of the sensor holder and the base to the connector.

12 Claims, 16 Drawing Sheets

US 8,418,581 B2

ACCELERATOR APPARATUS

CROSS REFERENCE TO RELATED APPLICATION

This application is based on and incorporates herein by reference Japanese Patent Application No. 2008-71687 filed on Mar. 19, 2008 and Japanese Patent Application No. 2008-276854 filed on Oct. 28, 2008.

BACKGROUND OF THE INVENTION

1. Field of the Invention

The present invention relates to an accelerator apparatus for a vehicle.

2. Description of Related Art

An accelerator apparatus controls an operational state of a vehicle according to the amount of depression of an accelerator pedal, which is depressed by a foot of a driver of the vehicle. In such an accelerator apparatus, the accelerator pedal is rotatably supported by a support member and is depressed by the foot of the driver to rotate in a depressing direction about a rotational axis thereof. Furthermore, the accelerator pedal is urged by a coil spring in a releasing direction, which is opposite from the depressing direction. When the depressing force, which is applied from the foot of the driver to the accelerator pedal, is released, the accelerator pedal is returned to its initial position by the urging force of the spring.

The rotational angle of the accelerator pedal, which is rotated against the urging force of the spring upon application of the depressing force from the foot of the driver, is measured with a rotational angle sensor. A rotational angle signal, which indicates the rotational angle of the accelerator pedal, is outputted from a signal output device of the accelerator apparatus to an engine control unit (ECU) of the vehicle.

Japanese Unexamined Patent Publication No. 2007-182150A teaches an accelerator apparatus, which has a sensing device (serving as the rotational angle sensor) and a connector (serving as the signal output device). A holder member, in which the sensing device and the connector are integrally molded with resin, is fixed to a main body (serving as the support member) with screws. In the case of the holder member, in which the sensing device and the connector are integrally molded, the connector projects from the main body.

Thus, at the time of assembling the accelerator apparatus to the vehicle body, when the connector of the accelerator apparatus is fitted to a corresponding vehicle body side connector, an external force may be applied to the connector of the accelerator apparatus by an assembly worker. That is, the load may be applied to the connector. In order to limit inadvertent removal of the holder member, in which the sensing device and the connector are integrally molded, from the main body (serving as the support member), the screws are used to fix the holder member to the main body. However, the holder member and the main body are formed as the resin molded products, respectively. Thus, a contact surface of the holder member and a corresponding opposed contact surface of the main body do not completely contact with each other therethrough with high accuracy. When the screws are tightened further, distortion may occur in the holder member, in which the sensing device and the connector are integrally molded. When an excessively large stress is applied to the sensing device, the sensing device, i.e., the sensor may possibly be damaged.

SUMMARY OF THE INVENTION

The present invention addresses the above disadvantages. According to the present invention, there is provided an accelerator apparatus for a vehicle. The accelerator apparatus includes a support member, an accelerator pedal, an urging member, a sensor, a signal output device, a sensor holder, a primary engaging arrangement and a secondary engaging arrangement. The support member is installable to a body of the vehicle. The accelerator pedal is rotatably supported by the support member. The accelerator pedal is rotated in a first rotational direction when the accelerator pedal is depressed by a driver of the vehicle. The urging member has one end portion engaged with the support member and urges the accelerator pedal in a second rotational direction, which is opposite from the first rotational direction. The sensor senses a relative rotational angle between the accelerator pedal and the support member and outputs a rotational angle signal, which indicates the relative rotational angle. The rotational angle signal received from the sensor is externally outputted out of the accelerator apparatus from the signal output device. The sensor holder is engaged with the support member and integrally holds the sensor and the signal output device at a first-side portion and a second-side portion, respectively, of the sensor holder, which are spaced from each other. The first-side portion of the sensor holder is engaged with the support member through the primary engaging arrangement. The second-side portion of the sensor holder is engaged with the support member through the secondary engaging arrangement. The secondary engaging arrangement includes at least one secondary engaging portion of the sensor holder, which is provided in the second-side portion of the sensor holder and is engaged with the support member. A distance from an engaging point between the secondary engaging portion of the sensor holder and the support member to the sensor is longer than a distance from the engaging point between the secondary engaging portion of the sensor holder and the support member to the signal output device.

BRIEF DESCRIPTION OF THE DRAWINGS

The invention, together with additional objectives, features and advantages thereof will be best understood from the following description, the appended claims and the accompanying drawings in which:

DETAILED DESCRIPTION OF THE INVENTION

Various embodiments of the present invention will be described with reference to the accompanying drawings.

First Embodiment

An accelerator apparatus according to a first embodiment of the present invention will be described with reference to FIGS. 1 to 13. As shown in FIGS. 1 and 3 to 7, the accelerator apparatus 1 is installed to a body of a vehicle, i.e., a vehicle body by fixing a bottom wall 31 of a base 3 (support member) with, for example, bolts and controls a driving value of the vehicle according to the amount of depression of an accelerator pedal 2. The accelerator apparatus 1 of the present embodiment uses the axle-by-wire (also sometimes referred to as the drive-by-wire), and the accelerator pedal 2 is thereby not mechanically connected to a throttle apparatus.

Figure 2:
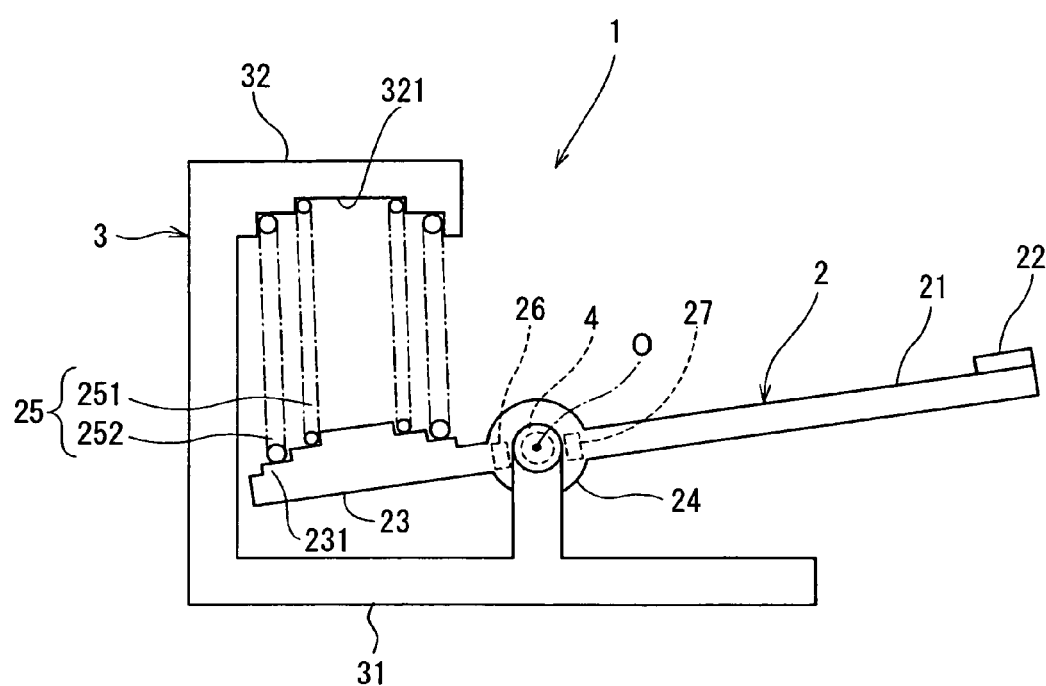
FIG. 2 is a schematic view showing an operation of the accelerator apparatus of the first embodiment.

With reference to FIG. 2, in the accelerator apparatus 1, the accelerator pedal 2 is supported by the base 3 in a manner that permits rotation of the accelerator pedal 2 about a rotational axis O. The accelerator pedal 2 is rotated in a depressing direction (a first rotational direction) when an operating portion 22 of the accelerator pedal 2 is depressed by a foot of a driver of the vehicle. Furthermore, the accelerator pedal 2 is urged by a compression coil spring (serving as an urging member) 25 in an opposite rotational direction (a second rotational direction), which is opposite from the depressing direction of the accelerator pedal 2 to return the accelerator pedal 2 into an initial position upon release of the foot of the driver from the operating portion 22 of the accelerator pedal 2. The coil spring 25 includes a first coil 251 and a second coil 252. One ends of the first and second coils 251, 252 are engaged with an engaging hole 321 of a ceiling wall 32 of the base 3. The other ends of the first and second coils 251, 252 are engaged with a spring receiving portion 231 of a spring rotor 23 of the accelerator pedal 2. A restoring force of the first coil 251 and a restoring force of the second coil 252 are applied collectively to the spring receiving portion 231 as a resultant urging force, which urges the accelerator pedal 2 in the releasing direction. At an axial end portion of a shaft member 24 of the accelerator pedal 2, two permanent magnets 26, 27, which have opposite polarities, respectively, are buried in two circumferential locations, respectively, which are displaced by generally 180 degrees from each other about the rotational axis O, to rotate integrally with the pedal arm 21. A rotational angle sensor 4 is fixed to the base 3 to radially oppose the magnets 26, 27, which are placed radially outward of the rotational angle sensor 4.

Figure 1:
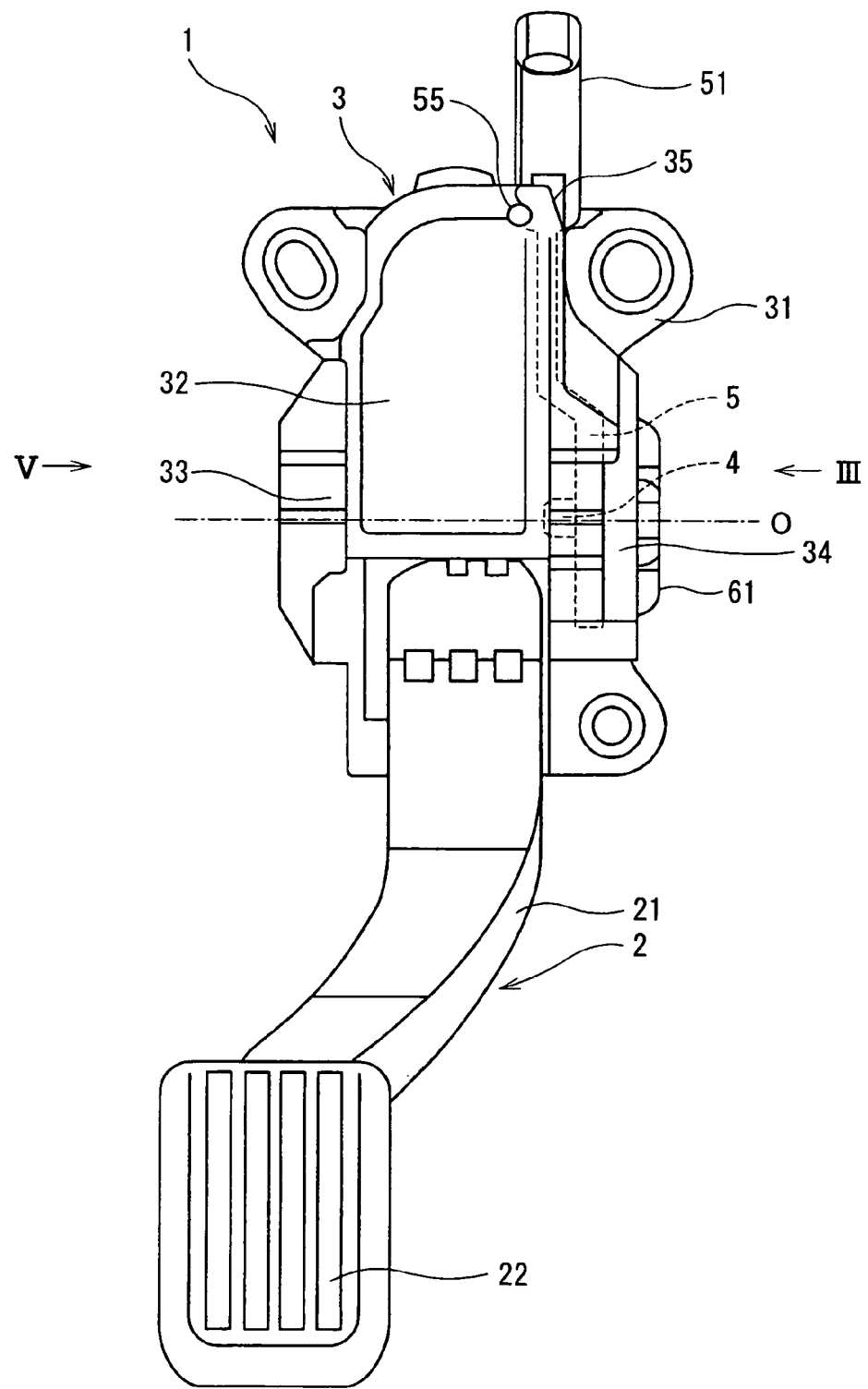
FIG. 1 is a plan view of an accelerator apparatus according to a first embodiment of the present invention.

In the accelerator apparatus 1, the base 3 shown in FIG. 1 is made of, for example, resin and is configured into a hollow body. The base 3 includes the bottom wall 31, the ceiling wall 32 and two lateral walls 33, 34. The bottom wall 31 and the ceiling wall 32 are opposed to each other in the top-to-bottom direction in FIG. 2, and the lateral walls 33, 34 are generally perpendicular to the bottom wall 31 and the ceiling wall 32. The lateral wall 34 includes a tertiary engaging portion 37 (see FIG. 3) and an opening 341 (see FIG. 6). The tertiary engaging portion 37 is formed as a protrusion (ridge).

The rotational angle sensor 4 includes two Hall elements 41, a capacitor (not shown) and terminals (not shown), which are integrally molded together with, for example, resin. The rotational angle sensor 4 is installed to one longitudinal end portion (first-side portion) 5a of the sensor holder 5, as shown in FIG. 5.

Figure 5:
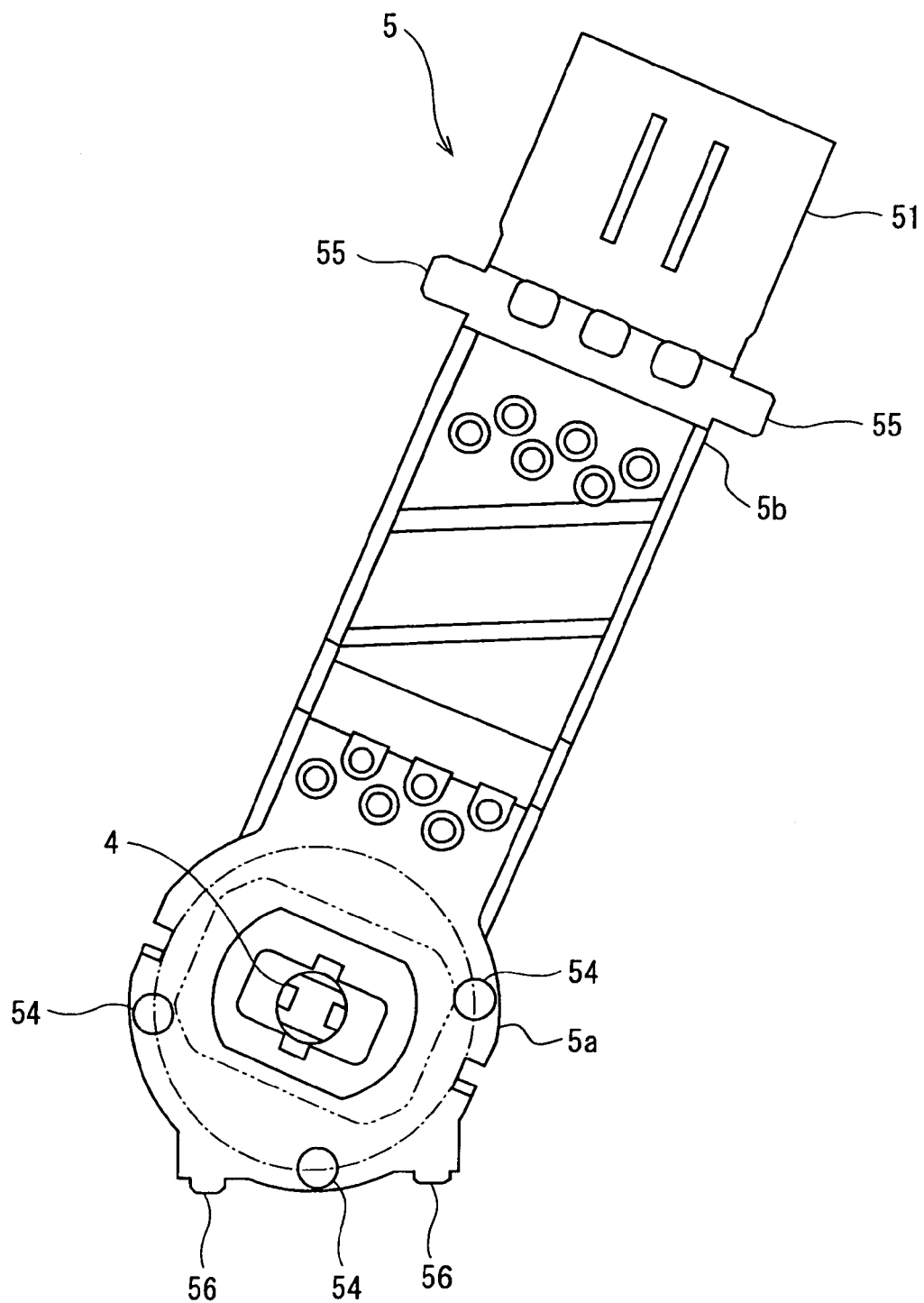
FIG. 5 is an enlarged plan view of a sensor holder of the accelerator apparatus taken in a direction of V in FIG. 1.

With reference to FIG. 5, the sensor holder 5 is made of, for example, resin to integrally hold the rotational angle sensor 4 and a connector 51. The connector 51 is provided to the other longitudinal end portion (second-side portion) 5b of the sensor holder 5 and serves as a signal output device that externally outputs a rotational angle signal, which is received from the rotational angle sensor 4 and indicates a relative rotational angle between the accelerator pedal 2 and the base 3. The connector 51 and the rotational angle sensor 4 are electrically connected with each other through terminals (not shown).

Figure 4:
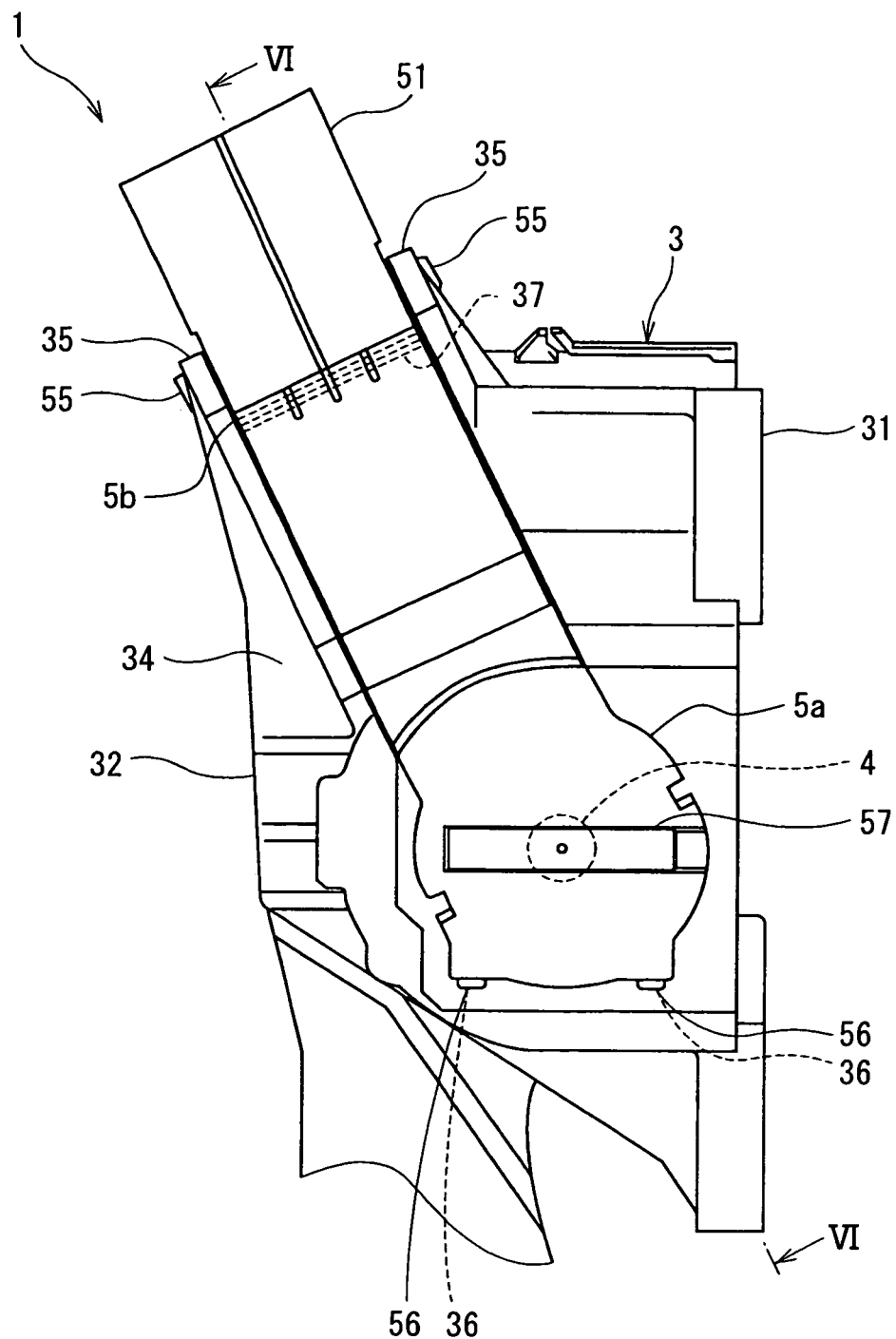
FIG. 4 is a partial side view of the accelerator apparatus of FIG. 3, from which a cover is removed for illustrative purpose.
Figure 11:
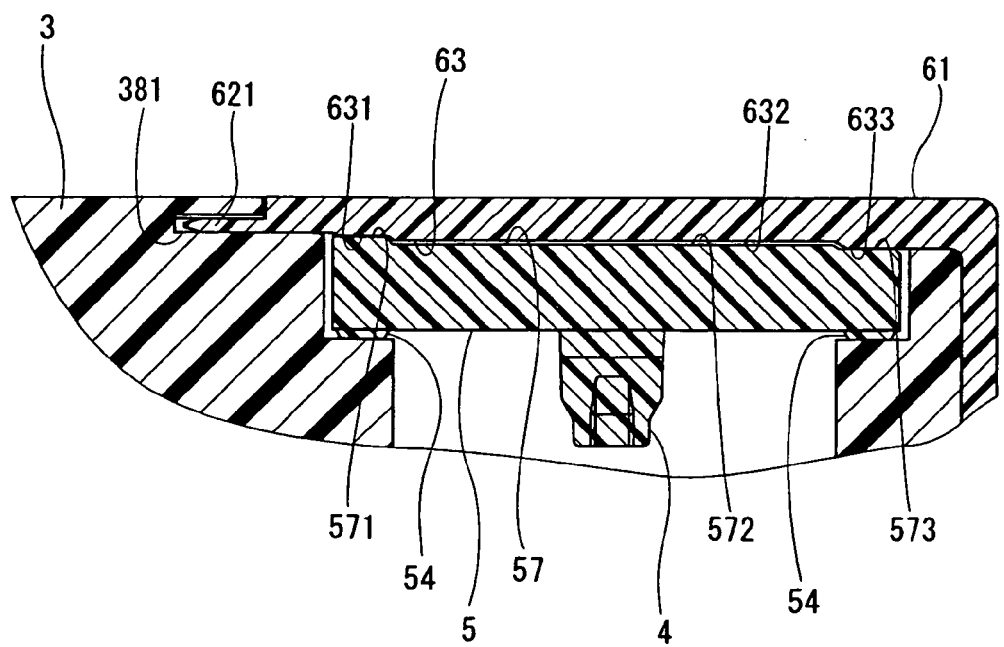
FIG. 11 is an enlarged cross-sectional view taken along line XI-XI in FIG. 3.
Figure 12:
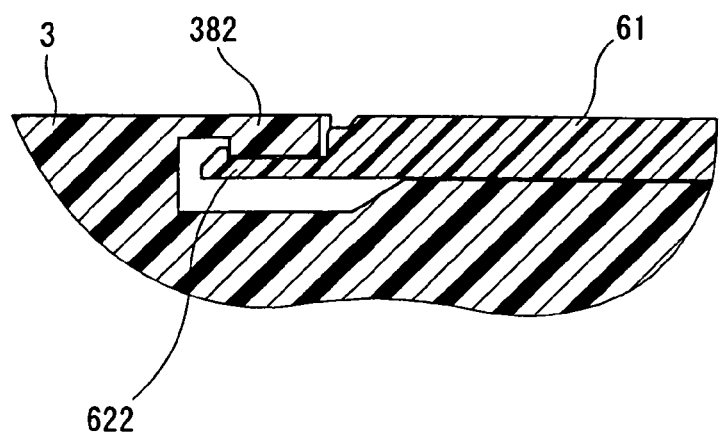
FIG. 12 is an enlarged cross-sectional view taken along line XII-XII in FIG. 3.

The sensor holder 5 has a plurality (three in this instance) of projections 54, which are circumferentially arranged one after another around the rotational angle sensor 4. As shown in FIG. 4, a reinforcing rib groove 57, which is configured into a stepwise form, is provided in the side (the front side of the plane of FIG. 4) of the sensor holder 5, which is opposite from the side (the back side of the plane of FIG. 4) of the sensor holder 5 where the rotational angle sensor 4 is held. As shown in FIG. 11, the reinforcing rib groove 57 is configured to have three steps, specifically, steps 571-573. The step 571 contacts a step 631, which is provided in a cover 61 described below. The step 573 contacts a step 633, which is provided in the cover 61.

The sensor holder 5 is fixed to the base 3 by engaging the first-side portion 5a and the second-side portion 5b of the sensor holder 5 to the base 3.

Figure 3:
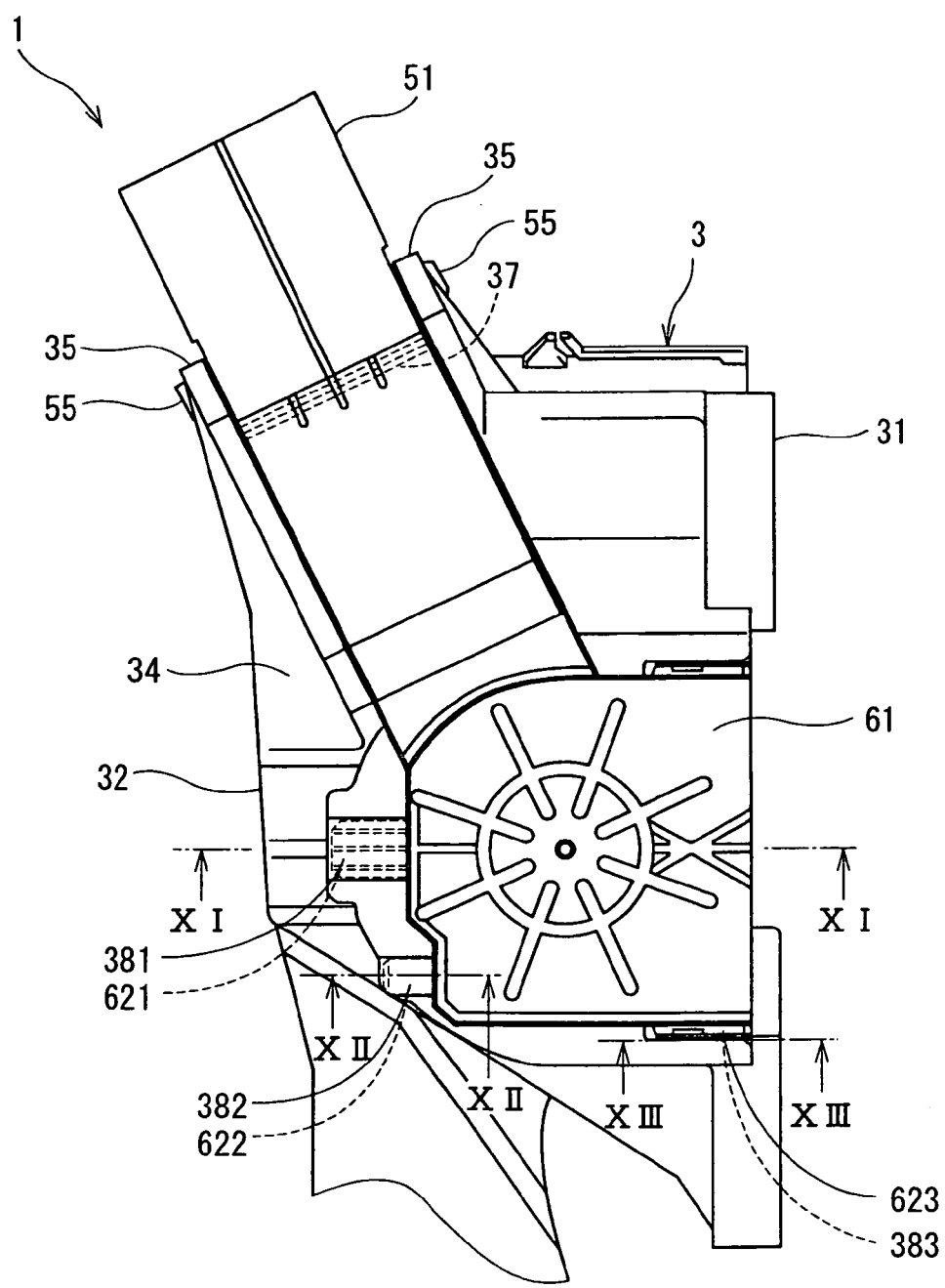
FIG. 3 is a side view taken in a direction of an arrow III in FIG. 1.

Specifically, an arrangement, through which the first-side portion 5a of the sensor holder 5 is engaged with the base 3, will be hereinafter referred to as a primary engaging arrangement. As shown in FIGS. 3 and 4, the primary engaging arrangement includes a plurality (two in this instance) of primary engaging portions 56 of the sensor holder 5, a plurality (two in this instance) of primary engaging portions 36 of the base 3 and the cover 61. The primary engaging portions 56 of the sensor holder 5 are arranged to engage with the primary engaging portions 36, respectively, of the base 3.

First to third mating portions 621-623 of the cover 61 are arranged to engage with first to third mating portions 381-

Figure 8:
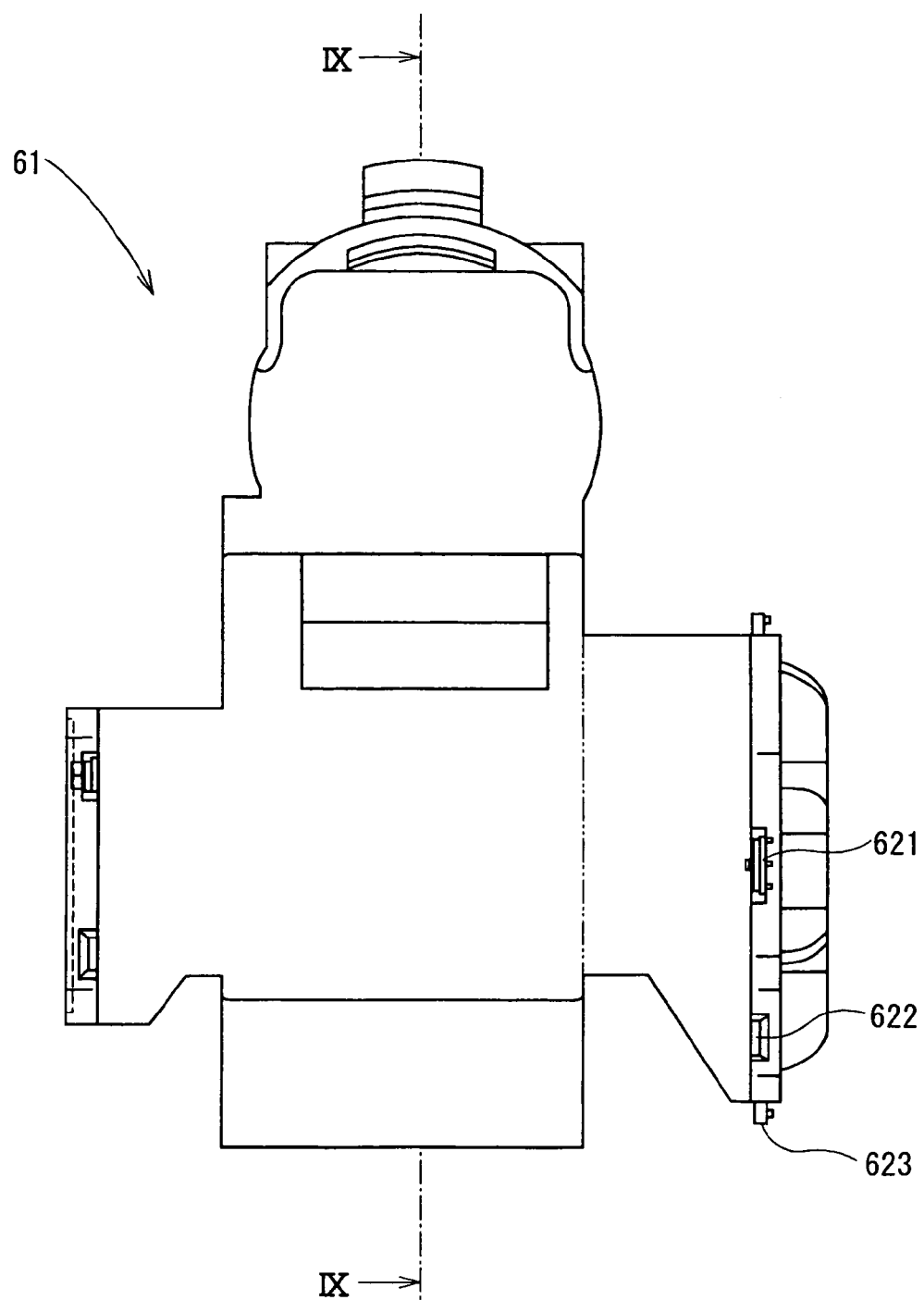
FIG. 8 is a plan view of a cover of the accelerator apparatus according to the first embodiment.
Figure 9:
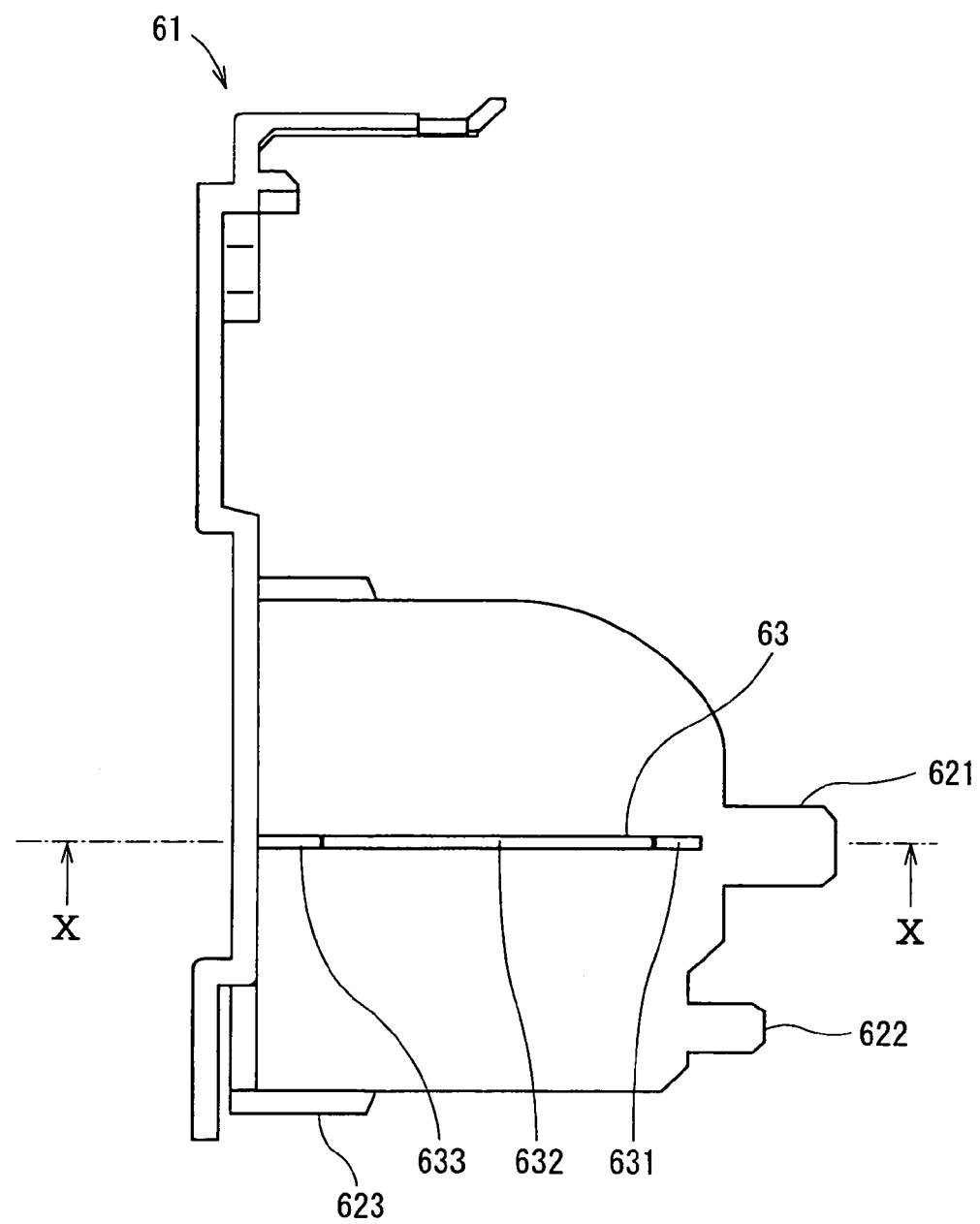
FIG. 9 is a side view taken along line IX-IX in FIG. 8.
Figure 10:
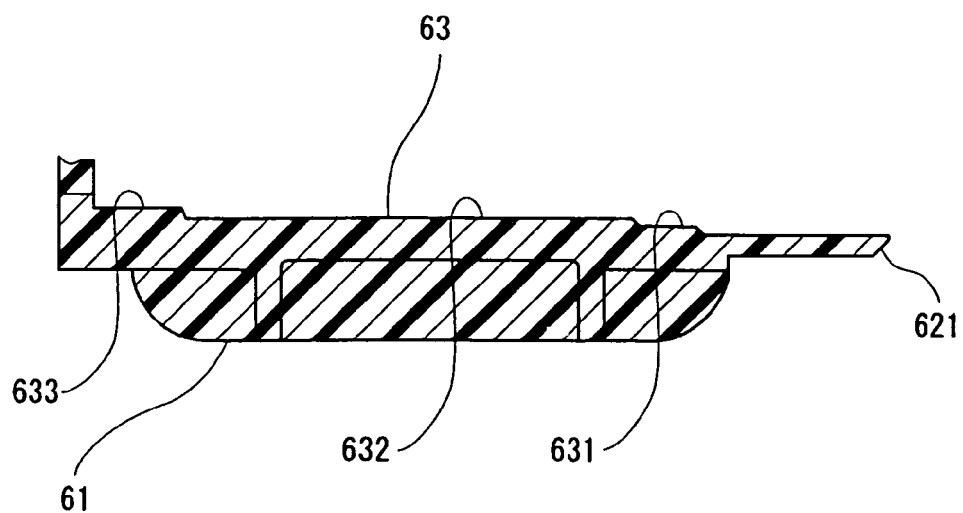
FIG. 10 is an enlarged cross-sectional view taken along line X-X in FIG. 9.

383, respectively, of the base 3. Furthermore, as shown in FIGS. 8 to 10, the cover 61 includes the steps 631-633.

Furthermore, an arrangement, which engages the second-side portion 5b of the sensor holder 5 to the base 3, will be hereinafter referred to as a secondary engaging arrangement. The secondary engaging arrangement includes a plurality (two in this instance) of secondary engaging portions 55 of the sensor holder 5 and a plurality (two in this instance) of secondary engaging portions 35 of the base 3. Each secondary engaging portion 55 of the sensor holder 5 is configured into a rod shape, and each secondary engaging portion 35 of the base 3 is configured into a hook shape, which defines a recess that is engageable with the corresponding rod shaped secondary engaging portion 55 of the sensor holder 5. The rod shaped secondary engaging portions 55 are provided at two locations, respectively, of the sensor holder 5, which are placed adjacent to the connector 51 on the left and right sides, respectively of the connector 51 in FIGS. 3 and 4. Furthermore, the hook shaped secondary engaging portions 35 are provided at two locations, respectively, of the base 3 to correspond with the rod shaped secondary engaging portions 55, respectively. An assembling procedure of the sensor holder 5 and the cover 61 to the base 3 in an assembling operation of the accelerator apparatus 1 will be now described with reference to FIGS. 3 to 6 and 8 to 13.

First of all, the rod shaped secondary engaging portions 55, which are provided at the two locations, respectively, in the second-side portion 5b of the sensor holder 5, are engaged with the hook shaped secondary engaging portions 35, respectively, which are provided at the two locations, respectively, in the base 3, so that the rotational angle sensor 4 of the sensor holder 5 is opposed to the magnets 26, 27, which are buried in the shaft member 24 of the accelerator pedal 2, at the opening 341 of the base 3.

Next, the primary engaging portions 56 of the sensor holder 5, which are provided at the first-side portion 5a of the sensor holder 5, are engaged with the primary engaging portions 36, respectively, of the base 3, which are provided at the lateral wall 34 of the base 3. In this way, the sensor holder 5 is installed to the base 3.

Figure 13:
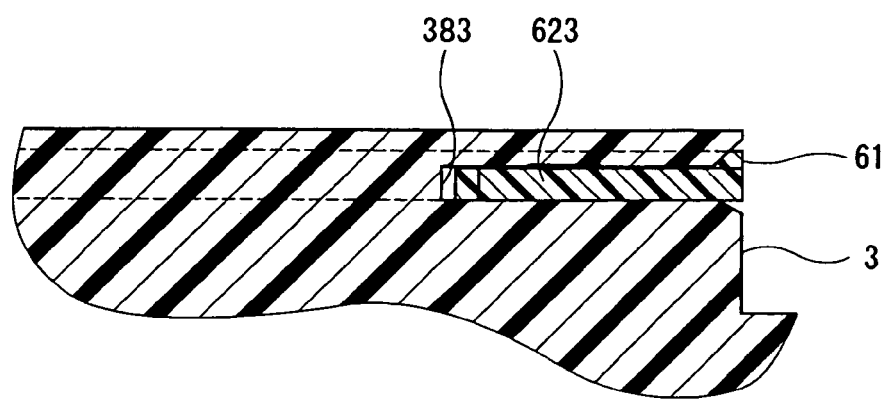
FIG. 13 is an enlarged cross-sectional view taken along line XIII-XIII in FIG. 3.

Thereafter, the cover 61 is installed to the base 3 in such a manner that the sensor holder 5 is held between the cover 61 and the base 3. The first mating portion 621 of the cover 61 shown in FIG. 11, the second mating portion 622 of the cover 61 shown in FIG. 12, and the third mating portion 623 of the cover 61 shown in FIG. 13 are engaged with the first to third mating portions 381-383, respectively, of the base 3, so that the cover 61 is installed to the base 3. At the time of installing the cover 61 to the base 3, a reinforcing rib 63 of the cover 61 is slidably guided in the reinforcing rib groove 57 of the sensor holder 5 and is thereby fitted to the reinforcing rib groove 57. At this time, as shown in FIG. 11, only the step 631 and the step 633 of the reinforcing rib 63 respectively contact the step 571 and the step 573 of the reinforcing rib groove 57, which are provided at the opposed ends, respectively, of the reinforcing rib groove 57. At this state, the step 572 of the reinforcing rib groove 57 does not contact the reinforcing rib 63. That is, the step 572 of the reinforcing rib groove 57 is spaced from the reinforcing rib 63.

As discussed above, in the case of the accelerator apparatus 1, the assembling procedure of the sensor holder 5 and the cover 61 to the base 3 includes (1) engaging the rod shaped secondary engaging portions 55 of the sensor holder 5 to the hook shaped secondary engaging portions 35 of the base 3, (2) engaging the primary engaging portions 56 of the sensor holder 5 to the primary engaging portions 36 of the base 3 by snap fitting, and (3) engaging the cover 61 to the base 3 by, for example, snap fitting. In this way, the sensor holder 5 can be installed to the base 3 in the simple manner without using the fasteners (e.g., screws).

Furthermore, in the accelerator apparatus 1, the surrounding peripheral portion of the sensor holder 5, which is located adjacent to the rotational angle sensor 4 and surrounds the rotational angle sensor 4, does not directly contact the base 3. Instead, the projections 54 of the sensor holder 5, which are further radially outwardly spaced from the rotational angle sensor 4 with respect to the surrounding peripheral portion of the sensor holder 5, contact the base 3. Therefore, in the assembling work, even in the case where an external force is applied to the rotational angle sensor 4 by, for example, an assembly worker who pushes the first-side portion 5a of the sensor holder 5 where the sensor 4 is provided, such an external force is effectively spread by the protrusions 54. Therefore, the stress, which is applied to the rotational angle sensor 4, can be reduced to limit a damage of the rotational angle sensor 4.

Furthermore, in the accelerator apparatus 1, as shown in FIG. 11, only the step 631 and the step 633 of the reinforcing rib 63 contact the step 571 and the step 573, which are provided at the opposed ends of the reinforcing rib groove 57, and the step 572 of the reinforcing rib groove 57 does not contact the reinforcing rib 63, as discussed above. Therefore, in the case of the assembling work for assembling the cover 61 to the base 3, even when the external force is applied to the rotational angle sensor 4 by, for example, the assembly worker who pushes the first-side portion 5a of the sensor holder 5, an excessively large force is not applied to the rotational angle sensor 4 due to the fact that the cover 61 contacts the first-side portion 5a of the sensor holder 5 only through the step 571 and the step 573 of the reinforcing rib groove 57. Therefore, it is possible to limit the damage of the rotational angle sensor 4.

The accelerator apparatus 1, which is assembled in the above-described manner, is installed to the vehicle body by, for example, fixing the bottom wall 31 of the base 3 to the vehicle body with the bolts or the like. At this time, the connector 51 is fitted to a corresponding vehicle body side connector to communicate the signal and the electric current therebetween.

Next, the operation of the accelerator apparatus 1 will be described. With reference to FIG. 2, when the driver of the vehicle depresses the operating portion 22 of the accelerator pedal 2 to adjust the amount of depression of the accelerator pedal 2, the pedal arm 21 is rotated, so that a magnetic field, which is generated by the magnets 26, 27 buried in the end portion of the shaft member 24 of the pedal arm 21, is changed. The rotational angle sensor 4 senses the rotational angle of the pedal arm 21, i.e., the rotational angle of the accelerator pedal 2 based on this change in the magnetic field.

When the connector 51 is fitted to the vehicle body side connector, an external force may be applied to the connector 51 by the assembly worker.

Figure 7:
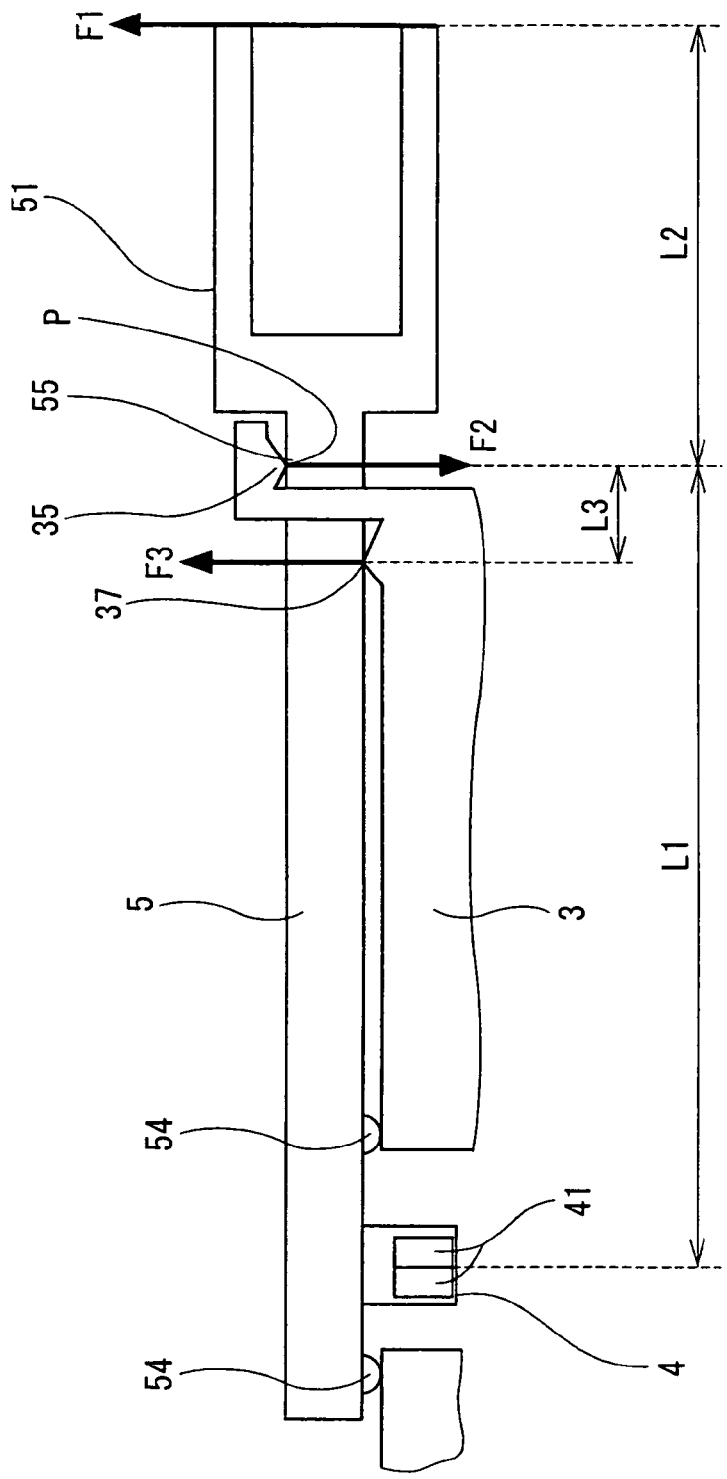
FIG. 7 is a schematic cross sectional view showing a state where an external stress is applied to a connector of the accelerator apparatus of FIG. 6.

With reference to FIG. 7 which is provided only for illustrative purpose (with simplified forms of the engaging portions), in a case where the external force is applied to the connector 51 in a direction of an arrow F1, an engaging point P between each secondary engaging portion 55 of the sensor holder 5 and the corresponding secondary engaging portion 35 of the base 3 serves as a fulcrum, and the stress may be applied to the rotational angle sensor 4, which is provided in the sensor holder 5.

At this time, in the accelerator apparatus 1, the secondary engaging portion 55 of the sensor holder 5 is located adjacent to the connector 51 in such a manner that a distance L1 from the engaging point, i.e., the fulcrum P between the secondary engaging portion 55 of the sensor holder 5 and the secondary engaging portion 35 of the base 3 to the sensor 4 (more specifically, the center of the sensor 4) is longer than a distance L2 from the engaging point P between the secondary engaging portion 55 of the sensor holder 5 and the secondary engaging portion 35 of the support member 3 to the connector 51 (more specifically, the end of the connector 51 where the external force F1 is applied in this instance). In this way, it is possible to reduce the stress, which is generated by the external force F1 at the first-side portion 5a of the sensor holder 5 where the sensor 4 is located, while using the engaging point P as the fulcrum because of the larger distance L1, which is larger than the distance L2. Here, when the secondary engaging portion 55 is placed closer to the connector 51, the stress, which is generated at the first-side portion 5a of the sensor holder 5, becomes smaller.

Figure 6:
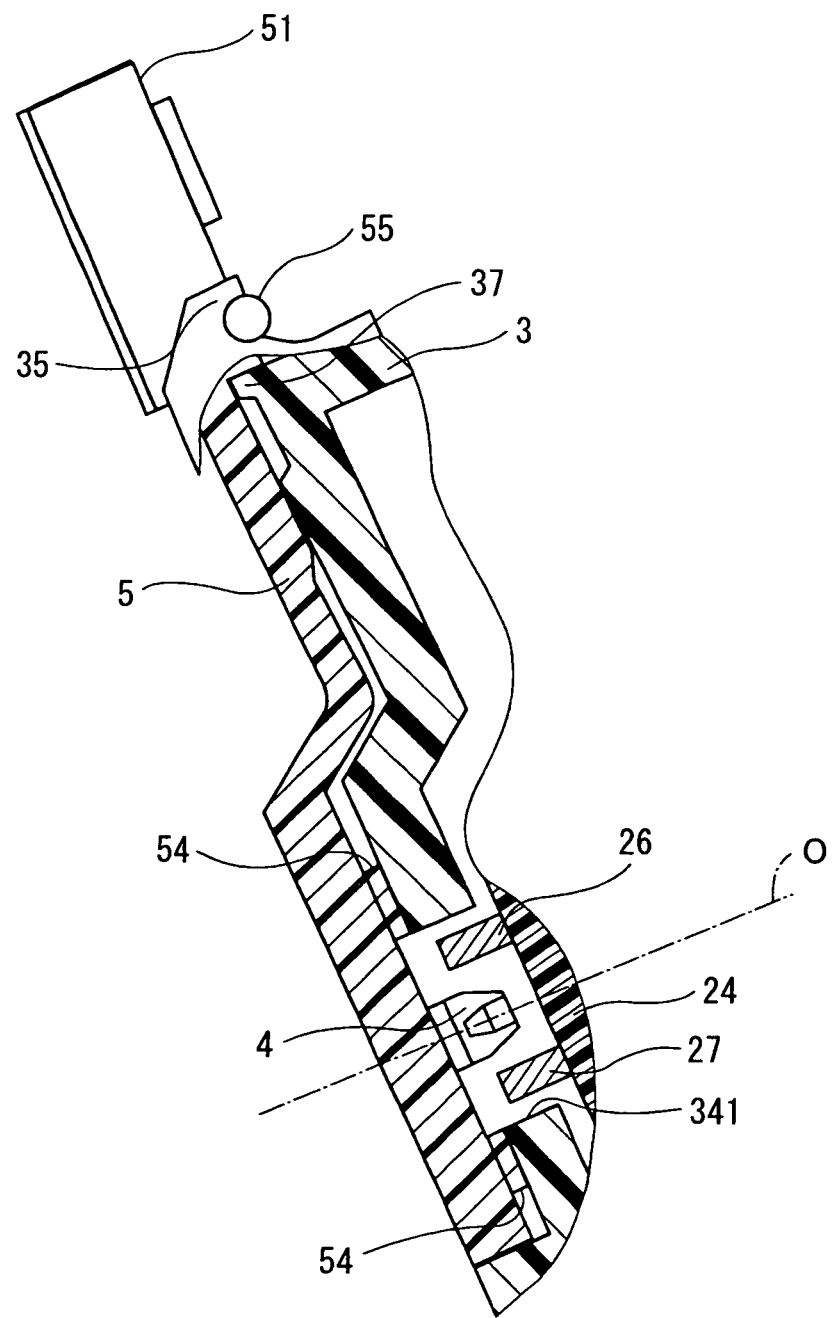
FIG. 6 is a partial fragmented cross-sectional view, showing a secondary engaging portion of the sensor holder and a secondary engaging portion of a base in the accelerator apparatus according to the first embodiment.

Furthermore, in the accelerator apparatus 1, as shown in FIG. 6, the tertiary engaging portion 37 is provided adjacent to the secondary engaging portions 35 in the base 3. In this way, as shown in FIG. 7, even when the connector 51 receives the external force F1, this external force F1 is substantially balanced with the force F2 from the point P, which serves as the fulcrum, and the reaction force F3 from the tertiary engaging portion 37 of the base 3. Thus, it is possible to reduce the reaction force, which is generated in the rotational angle sensor 4 through the application of the external force F1, to the rotational angle sensor 4. Here, when the distance from the tertiary engaging portion 37 to the connector 51 is reduced, the stress generated in the rotational angle sensor 4 can be reduced.

In the accelerator apparatus 1, in a case where an external force is applied to the connector 51 in a direction, which is opposite from the direction indicated by the arrow F1 in FIG. 7, the sensor holder 5 receives a force in a direction away from the base 3 while the tertiary engaging portion 37 serving as the fulcrum. However, at that time, the cover 61 holds the sensor holder 5 to limit the movement of the cover 61 in the direction away from the base 3. At this timer as shown in FIG. 11, since only the step 631 and the step 633 of the reinforcing rib 63 contact the step 571 and the step 573 of the reinforcing rib groove 57 in the sensor holder 5, the rotational angle sensor 4 will not receive the excessive force.

As described above, in the accelerator apparatus 1, the secondary engaging portions 55 are provided to the corresponding locations of the sensor holder 5, which are adjacent to the connector 51, and the tertiary engaging portion 37 is provided to the corresponding location of the base 3, which is adjacent to the secondary engaging portions 35. In this way, even when the external force F1 is applied to the connector 51, the stress applied to the rotational angle sensor 4 can be reduced. Thus, the damage of the rotational angle sensor 4 can be limited.

As discussed above, in the case of the accelerator apparatus 1 of the present embodiment, the sensor holder 5 can be assembled to the base 3 without using the fasteners (e.g., screws). Since the fasteners (e.g., the screws) are not used, the sensor holder 5 can be easily attached to and removed from the base 3, allowing the easy assembling operation. Also, since the fasteners (e.g., the screws) are not used, it is possible to avoid the application of the excessive stress to the rotational angle sensor 4, which would be caused by the deformation of the sensor holder 5 upon application of a tightening force for tightening the screw. Thus, it is possible to limit the damage of the rotational angle sensor 4.

Furthermore, in the case of the accelerator apparatus 1 of the present embodiment, even when the external force is applied to the connector 51 of the accelerator apparatus 1, this external force is substantially balanced with the force F2 from the point (the engaging point between each secondary engaging portion 55 of the sensor holder 5 and the corresponding secondary engaging portion 35 of the base 3) P, which serves as the fulcrum, and the reaction force F3 from the tertiary engaging portion 37 of the base 3. Therefore, the excessively large stress is not applied to the rotational angle sensor 4, and thereby it is possible to limit the damage to the rotational angle sensor 4.

Second Embodiment

Figure 14:
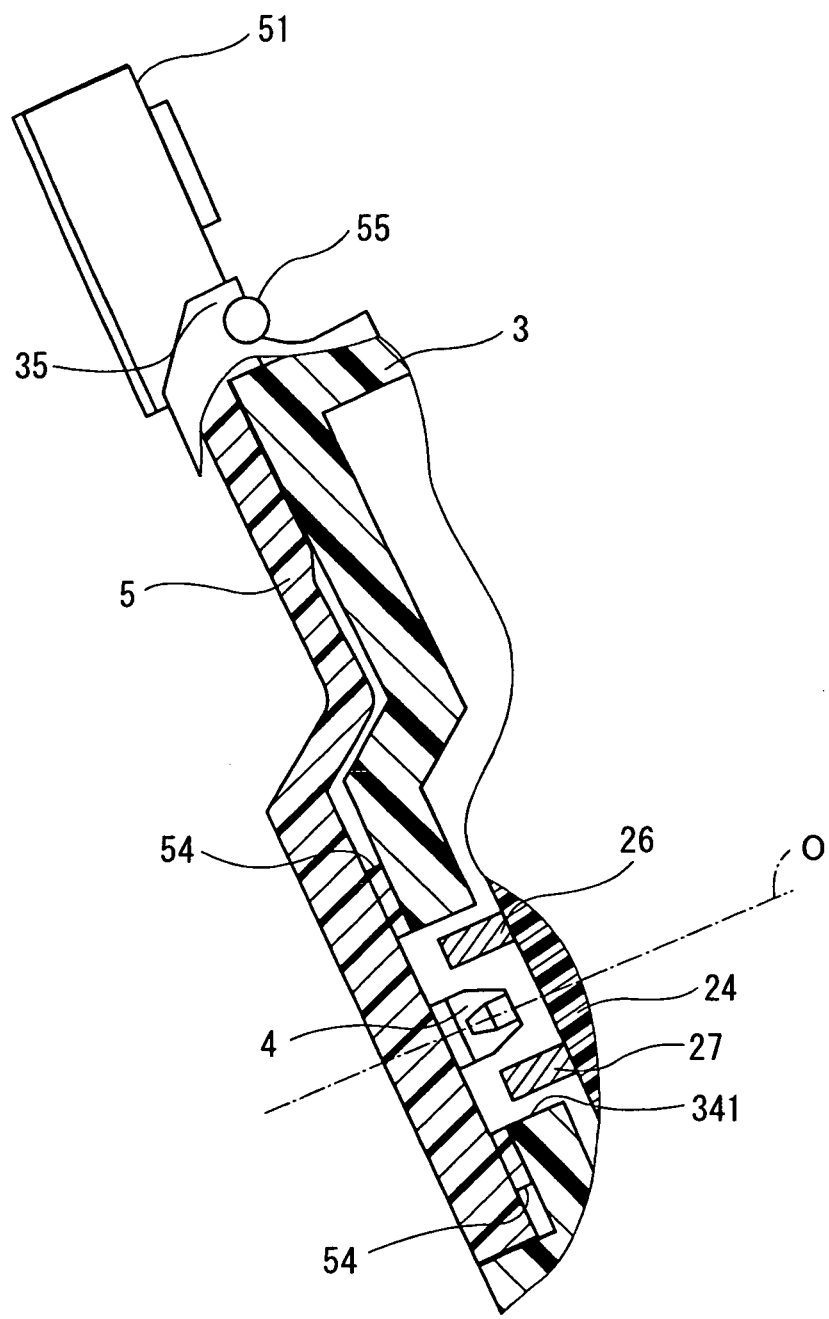
FIG. 14 is a partial fragmented cross-sectional view, showing a secondary engaging portion of a sensor holder and a secondary engaging portion of a base in an accelerator apparatus according to a second embodiment of the present invention.
Figure 15:
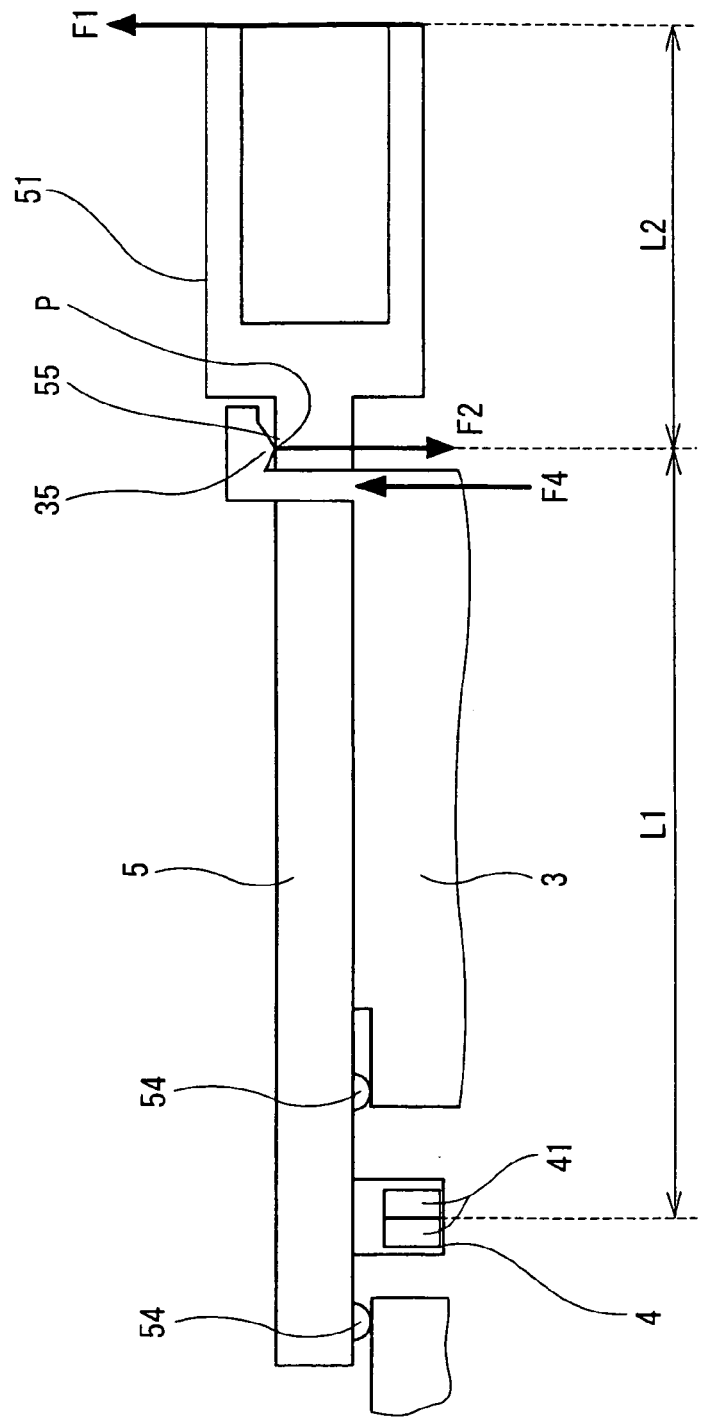
FIG. 15 is a schematic view, showing a state where an external force is applied to a connector of the accelerator apparatus of FIG. 14.

FIG. 14 shows a second embodiment of the present invention. In the present embodiment as well as any of the subsequent embodiments described below, components, which are similar to those of the first embodiment, will be indicated by the same reference numerals and will not be described further for the sake of simplicity. The present embodiment is similar to the first embodiment except that the tertiary engaging portion 37 of the first embodiment shown in FIG. 6 is eliminated. In the present embodiment, with reference to FIG. 15, the external force F1, which is applied to the connector 51, is substantially balanced with the force F2 from the point (the engaging point between each secondary engaging portion 55 of the sensor holder 5 and the corresponding secondary engaging portion 35 of the base 3) P, which serves as the fulcrum, and a reaction force F4 from the base (support member) 3 to the secondary engaging portion 35 of the base 3. In this way, it is possible to reduce the stress, which is applied to the first-side portion 5a of the sensor holder 5 where the sensor 4 is provided.

Third Embodiment

In a third embodiment of the present invention, the tertiary engaging portion 37 of the base (the support member) 3 of the first embodiment shown in FIG. 6, which is provided adjacent to the secondary engaging portions 35, is eliminated, and a tertiary engaging portion, which is similar to the tertiary engaging portion 37, is provided in the sensor holder 5 at the location, which is adjacent to the secondary engaging portions 35. In this way, similar to the first embodiment, it is possible to reduce the stress, which is applied to the first-side portion 5a of the sensor holder 5 where the rotational angle sensor 4 is provided.

Fourth Embodiment

In a fourth embodiment of the present invention, the primary engaging arrangement includes the primary engaging portions 56 of the sensor holder 5 and the primary engaging portions 36 of the base 3 of the first embodiment and does not include the cover 61 of the first embodiment (the state similar to that of FIG. 4 where the cover 61 is removed for the illustrative purpose). In the present embodiment, the first-side portion 5a of the sensor holder 5 is engaged to the base 3 only with the primary engaging portions 56 of the sensor holder 5 and the primary engaging portions 36 of the base 3. In this way, the sensor holder 5 can be engaged to the base 3 in the simple manner without using the fasteners (e.g., screws).

Fifth Embodiment

In a fifth embodiment of the present invention, the primary engaging arrangement includes the cover 61 of the first embodiment and does include the primary engaging portions 56 of the sensor holder 5 and the primary engaging portions 36 of the base 3 of the first embodiment. In the present embodiment, the first-side portion 5a of the sensor holder 5 is not engaged to the base 3 through the primary engaging portions 36, 56, and the first-side portion 5a of the sensor holder 5 is engaged to the base 3 only by the cover 61. In this way, the sensor holder 5 can be engaged to the base 3 in the simple manner without using the fasteners (e.g., screws).

Sixth Embodiment

Figure 16A:
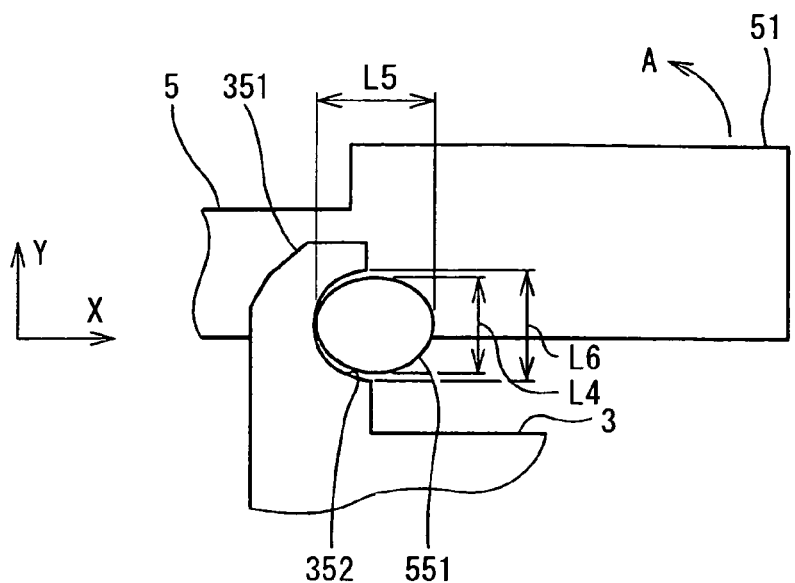
FIG. 16A is a schematic view, showing a positional relationship between a secondary engaging portion of a sensor holder and a secondary engaging portion of a base in one operational state of an accelerator apparatus according to a sixth embodiment of the present invention.
Figure 16B:
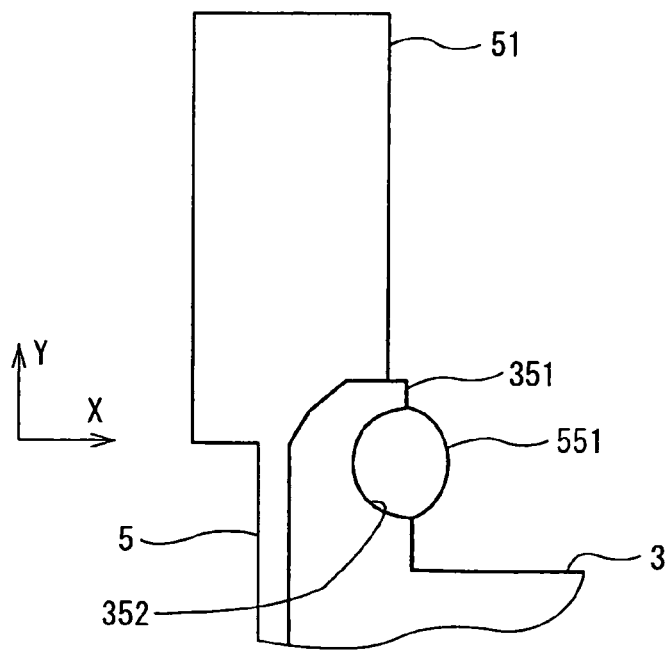
FIG. 16B is a schematic view, showing a positional relationship between the secondary engaging portion of the sensor holder and the secondary engaging portion of the base in another operational state of the accelerator apparatus shown in FIG. 16A.

FIGS. 16A and 16B show a sixth embodiment of the present invention. In FIGS. 16A and 16B, components, which are similar to those of the first embodiment, will be indicated by the same reference numerals.

In the present embodiment, as shown in FIG. 16A, rod shaped secondary engaging portions (hereinafter, also referred to as rod portions) 551 of the sensor holder 5 are configured to have a generally ellipsoidal cross section in an imaginary plane that is generally perpendicular to the axial direction of the rod portion 551. A recess 352 of each of hook shaped secondary engaging portions 351 of the base 3 is configured as follows.

A size of a minor axis L4 of the ellipsoidal cross section of each rod portion 551 is equal to or smaller than an opening width (size of the opening) L6 of the corresponding recess 352. Furthermore, a size of a major axis L5 of the ellipsoidal cross section of the rod portion 551 is larger than the opening width L6 of the recess 352. That is, a relationship of L4≦L6<L5 is satisfied.

At the time of assembling the sensor holder 5 to the base 3, the rod shaped secondary engaging portions (the rod portions) 551 of the sensor holder 5 are engaged to the secondary engaging portions 351 of the base 3, as shown in FIG. 16A (the contacting state or the first rotational position). Next, the sensor holder 5 is rotated in a direction of an arrow A in FIG. 16A to engage the sensor holder 5 to the base 3 (the engaged state or the second rotational position). After the assembly, as shown in FIG. 16B, the part of the rod portion 551, which has the major axis L5, is resiliently deformed and is press fitted into the recess 352.

The above relationship between the rod portion 551 and the recess 352 can be rephrased as follows. That is, the size (corresponding to the size L4) of the rod portion 551, which is measured in a predetermined direction (a Y-direction, i.e., a top-to-bottom direction in FIG. 16A) in the imaginary plane that is generally perpendicular to the axis of the rod portion 551 in the first rotational position of the sensor holder 5 shown in FIG. 16A, is equal to or smaller than the size (corresponding to the size L6) of the opening of the recess 352, which is measured in the predetermined direction (the Y-direction) in the imaginary plane in the first rotational position of the sensor holder 5. Furthermore, the size (corresponding to the size L5 but measured in the Y-direction, i.e., the top-to-bottom direction in FIG. 16B) of the rod portion 551, which is measured in the predetermined direction (the Y-direction) in the imaginary plane in the second rotational position of the sensor holder 5 shown in FIG. 16B, is larger than the size (corresponding to the size L6) of the opening of the recess 352, which is measured in the predetermined direction (the Y-direction) in the imaginary plane in the first rotational position of the sensor holder 5 shown in FIG. 16A.

According to the present embodiment, the rod portion (i.e., the secondary engaging portion) 551 of the sensor holder 5 can be relatively securely fixed to the recess 352 of the secondary engaging portion 351 of the base 3 by the press fitting. Therefore, even when the external force is applied to the connector 51, it is possible to reduce the stress, which is applied to the rotational angle sensor 4, to limit the damage of the rotational angle sensor 4.

Furthermore, the rotation (the rotation from the first rotational position to the second rotational position) of each rod portion 551 within the corresponding recess 352 is smoothed, so that the assembling of the sensor holder 5 to the base 3 is eased.

Seventh Embodiment

Figure 17:
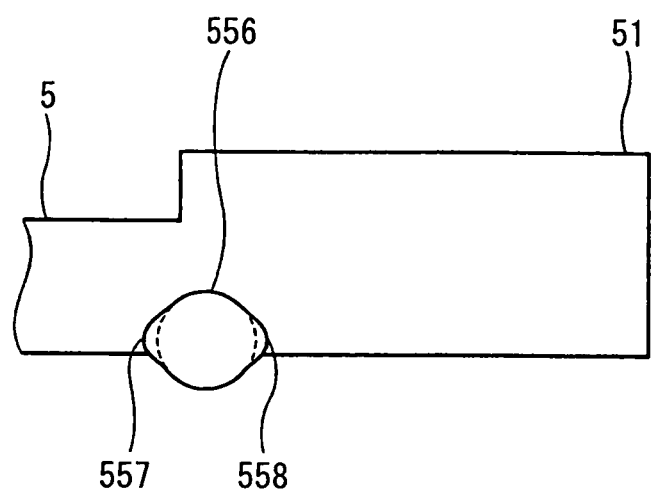
FIG. 17 is a partial fragmented schematic cross-sectional view, showing a secondary engaging portion of a sensor holder in an accelerator apparatus according to a seventh embodiment of the present invention.

FIG. 17 shows a seventh embodiment of the present invention. In FIG. 17, components, which are similar to those of the sixth embodiment, will be indicated by the same reference numerals.

In the present embodiment, a cross-sectional area of each of rod shaped secondary engaging portions (hereinafter, also referred to as rod portions) 556 of the sensor holder 5 in the imaginary plane that is generally perpendicular to the axis of the rod portion 556 has two diametrically opposed arcuate projections 557, 558. Each of the arcuate projections 557, 558 projects radially outward from the rest of the cross section (a generally circular cross section) of the rod portion 556. In this way, the width of the rod portion 556, which is measured in the projecting direction of the arcuate projections 557, 558, is larger than the opening width of the recess 352 of the secondary engaging portion 351 of the base 3 (see FIG. 16A of the sixth embodiment).

In the present embodiment, the rotation (the rotation from the first rotational position to the second rotational position) of the rod portion 556 within the recess 352 of the secondary engaging portion 351 of the base 3 is smoothened by the arcuate projections 557, 558. Therefore, the assembling of the sensor holder 5 to the base (support member) 3 is eased.

Eighth Embodiment

Figure 18A:
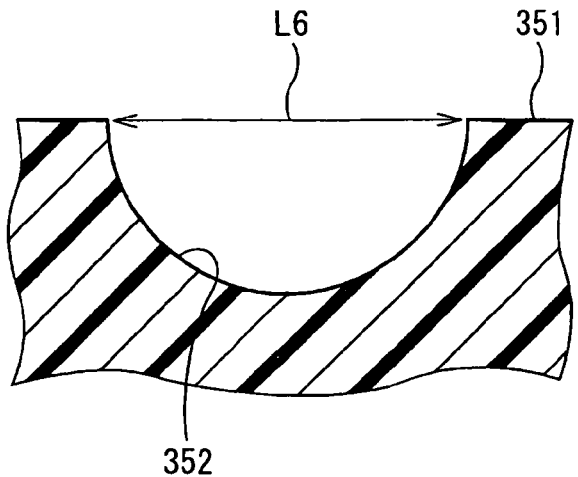
FIGS. 18A to 18C are partial enlarged schematic cross-sectional views, showing various types of recess of a secondary engaging portion of a base of an accelerator apparatus according to an eighth embodiment of the present invention.
Figure 18B:
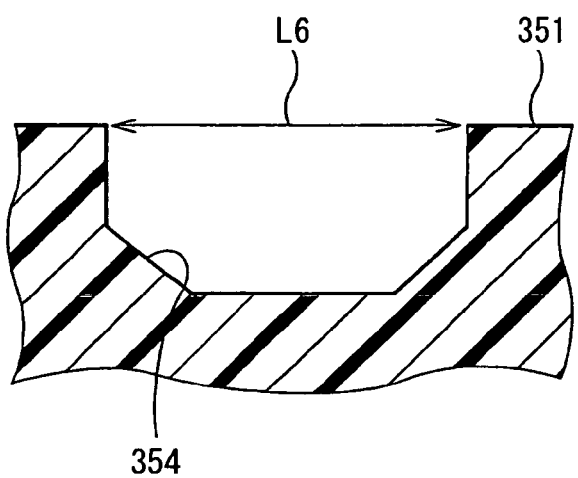
Figure 18C:
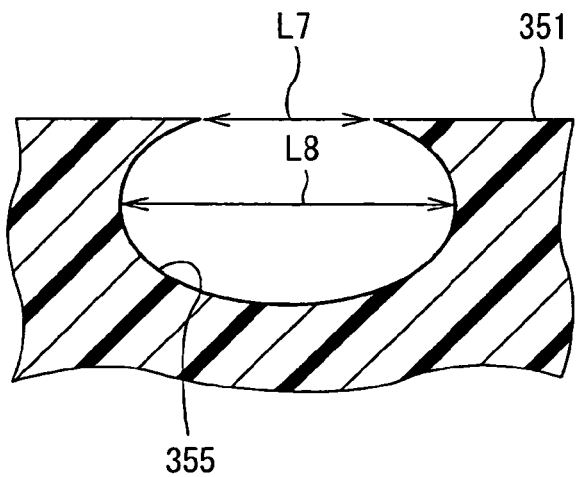

FIGS. 18A to 18C show an eighth embodiment of the present invention. In FIGS. 18A to 18C, components, which are similar to those of the sixth embodiment, will be indicated by the same reference numerals. In the sixth and seventh embodiments, the shape of each of the rod portions 551, 556 is discussed.

In contrast, in the present embodiment, the shape of the recess of each of the secondary engaging portions of the base 3 may be modified into any appropriate shape as long as the corresponding rod portion, i.e., the corresponding secondary engaging portion of the sensor holder 5 can be press fitted into the recess of the secondary engaging portion of the base 3. Therefore, in the present embodiment, the shape of the recess of the secondary engaging portion of the base 3 will be described.

FIG. 18A shows the recess 352 of the secondary engaging portion 351 of the base 3, which is similar to that of the sixth embodiment.

Alternative to the recess 352, it is possible to have a recess 354 of FIG. 18B, which has a polygonal cross section (defined by straight lines).

Furthermore, alternative to the recess 352, it is possible to have a recess 355 of FIG. 18C, which has an ellipsoidal cross section with a width (major axis) L8 that is larger than the opening width L7 of the recess 355. In this case, the width of the rod portion (the secondary engaging portion) of the sensor holder 5, which is press fitted into the recess 355, is larger than the width L8. That is, the relationship of the size of the minor axis L4 and the size of the major axis L5 of the sixth embodiment becomes the relationship of L4<L8<L5.

Even in the present embodiment, the rod portion (the secondary engaging portion) of the sensor holder 5 and the recess of the secondary engaging portion of the base 3 can be securely fixed together by press fitting.

Other Embodiments

In the accelerator apparatus of another embodiment, which is other than the above-described embodiments, the sensor holder 5 may alternatively have the recesses of the secondary engaging portions, and the base (the support member) 3 may have the rod shaped secondary engaging portions (the rod portions).

In such a case, the tertiary engaging portion may be provided in the base (the support member) 3 at the location adjacent to the rod shaped secondary engaging portions (the rod portions). Alternatively, the tertiary engaging portion may be provided in the sensor holder 5 at the location adjacent to the recesses of the secondary engaging portions. Further alternatively, the tertiary engaging portion may be eliminated.

Also, the cross section of the rod shaped secondary engaging portion (the rod portion) in the imaginary plane generally perpendicular to the axis of the rod portion may be an ellipsoidal. Also, the cross section may have arcuate projection(s), which are similar to the arcuate projections 557, 558 of FIG. 17. Furthermore, the shape of the recess may be of any appropriate shape as long as the rod portion can be press fitted therein.

The present invention is not limited to the above embodiments, and the above embodiments may be modified within the spirit and scope of the present invention.

Additional advantages and modifications will readily occur to those skilled in the art. The invention in its broader terms is therefore not limited to the specific details, representative apparatus, and illustrative examples shown and described.

What is claimed is:

1. An accelerator apparatus for a vehicle, comprising:
a support member that is installable to a body of the vehicle;
an accelerator pedal that is rotatably supported by the support member, wherein the accelerator pedal is rotated in a first rotational direction when the accelerator pedal is depressed by a driver of the vehicle;
an urging member that has one end portion engaged with the support member and urges the accelerator pedal in a second rotational direction, which is opposite from the first rotational direction;
a sensor that senses a relative rotational angle between the accelerator pedal and the support member and outputs a rotational angle signal, which indicates the relative rotational angle;
a signal output device, from which the rotational angle signal received from the sensor is externally outputted out of the accelerator apparatus;
a sensor holder that is fixed to the support member solely through interlocking engagement between the sensor holder and the support member at a first-end portion and a second-end portion, respectively, of the sensor holder, which are spaced from each other, to inhibit removal of the sensor holder from the support member, and the sensor holder integrally holds the sensor and the signal output device;
a primary engaging arrangement, through which the first-end portion of the sensor holder is engaged with the support member; and
a secondary engaging arrangement, through which the second-end portion of the sensor holder is engaged with the support member, wherein:
the secondary engaging arrangement includes first and second secondary engaging portions that extend in opposite directions from the second end-portion of the sensor holder;
the secondary engaging arrangement further includes first and second secondary engaging portions on the support member, the first and second secondary engaging portions on the support member being engaged with the first and second secondary engaging portions of the sensor holder, respectively;
one of the secondary engaging portions of the sensor holder and the secondary engaging portions of the support member comprising recesses, which are recessed in a direction generally perpendicular to a longitudinal direction of the signal output device; and
the other one of the secondary engaging portions of the sensor holder and the secondary engaging portions of the support member comprising rod portions, which are engaged with the recess;
a distance from an engaging point between the secondary engaging portions of the sensor holder and the support member to the sensor is longer than a distance from the engaging point between the secondary engaging portions of the sensor holder and the support member to the signal output device; and
the sensor holder is adapted to rotate about the secondary engaging portions of the sensor holder while the secondary engaging portions of the sensor holder contact the secondary engaging portions of the support member in order to attach the sensor holder to the support member.

2. The accelerator apparatus according to claim 1, wherein the primary engaging arrangement includes:
at least one primary engaging portion of the sensor holder, which is provided in the first-end portion of the sensor holder; and
at least one primary engaging portion of the support member, which is provided in a corresponding location of the support member to engage with the at least one primary engaging portion of the sensor holder.

3. The accelerator apparatus according to claim 1, wherein the primary engaging arrangement includes a cover that covers the first-end portion of the sensor holder.

4. The accelerator apparatus according to claim 1, wherein:
the support member includes a tertiary engaging portion that is provided at an adjacent location of the support member, which is adjacent to the secondary engaging portions of the support member, to engage with the sensor holder.

5. The accelerator apparatus according to claim 1, wherein:
the sensor holder is rotatable relative to the support member between a first rotational position and a second rotational position to place the sensor holder in an engaged state relative to the support member while the rod portions are received in the recess;
the rod portions are loosely received in the recesses in the first rotational position of the sensor holder; and
the rod portions are press fitted into the recesses in the second rotational position of the sensor holder.

6. The accelerator apparatus according to claim 5, wherein:
a size of the rod portions, which is measured in a predetermined direction in an imaginary plane that is generally perpendicular to an axis of the rod portions in the first rotational position of the sensor holder, is equal to or smaller than a size of an opening of the recesses, which is measured in the predetermined direction in the imaginary plane in the first rotational position of the sensor holder; and the size of the rod portions, which is measured in the predetermined direction in the imaginary plane in the second rotational position of the sensor holder, is larger than the size of the opening of the recesses, which is measured in the predetermined direction in the imaginary plane in the first rotational position of the sensor holder.

7. The accelerator apparatus according to claim 6, wherein at least one of the recesses and the rod portions has a generally ellipsoidal cross section in the imaginary plane.

8. The accelerator apparatus according to claim 6, wherein a cross section of each of the rod portions in the imaginary plane has at least one arcuate projection, which projects radially outward from the rest of the cross section of the rod portions.

9. The accelerator apparatus according to claim 1, wherein the sensor holder has at least one projection, which is formed around the sensor and contacts the support member.

10. The accelerator apparatus according to claim 1, wherein the sensor is a contactless sensor.

11. The accelerator apparatus according to claim 1, wherein the sensor is a magnetic sensor.

12. The accelerator apparatus according to claim 1, wherein:

the secondary engaging portions of the support member comprise the recesses; and the secondary engaging portions of the sensor holder comprise the rod portions.

* * * * *